United States Patent
Meidar et al.

(10) Patent No.: US 8,694,150 B2
(45) Date of Patent: Apr. 8, 2014

(54) MACHINING INSTALLATION FOR WORKPIECES

(75) Inventors: Moshe Israel Meidar, New York, NY (US); Wolfgang Horn, Goppingen (DE); Siegfried Schmalzried, Singen (DE); Waldemar Haus, Winnenden (DE)

(73) Assignee: MAG IAS GmbH, Goppingen (DE)

( * ) Notice: Subject to any disclaimer, the term of this patent is extended or adjusted under 35 U.S.C. 154(b) by 572 days.

(21) Appl. No.: 13/000,770

(22) PCT Filed: Jul. 1, 2009

(86) PCT No.: PCT/EP2009/004746
§ 371 (c)(1),
(2), (4) Date: Jun. 9, 2011

(87) PCT Pub. No.: WO2010/000457
PCT Pub. Date: Jan. 7, 2010

(65) Prior Publication Data
US 2011/0288677 A1    Nov. 24, 2011

(30) Foreign Application Priority Data
Jul. 3, 2008   (DE) .......................... 10 2008 031 487

(51) Int. Cl.
| | | |
|---|---|---|
| G06F 19/00 | (2011.01) |
| B26D 5/08 | (2006.01) |
| B26D 7/00 | (2006.01) |
| B23C 1/14 | (2006.01) |
| B23D 7/08 | (2006.01) |
| B24B 7/00 | (2006.01) |
| B24B 9/00 | (2006.01) |
| B24B 41/00 | (2006.01) |
| B24B 47/02 | (2006.01) |
| B24B 5/00 | (2006.01) |
| B23Q 11/00 | (2006.01) |
| B23Q 16/00 | (2006.01) |
| B23Q 3/155 | (2006.01) |
| B23Q 3/157 | (2006.01) |

(52) U.S. Cl.
USPC ............. 700/193; 700/114; 83/640; 83/648; 409/165; 409/225; 409/235; 451/119; 451/162; 451/177; 451/340; 451/392; 451/398; 483/13; 483/20; 483/43; 483/50

(58) Field of Classification Search
USPC ................... 700/95, 114, 117, 159, 186, 193; 83/523, 613, 640, 648; 408/69–71; 409/64, 159–161, 163–165, 172, 173, 409/219, 225, 235; 451/64, 119, 162, 177, 451/340, 364, 392, 397, 398; 483/8–11, 13, 483/16–20, 30, 31, 38, 39, 43, 44, 49, 50
See application file for complete search history.

(56) References Cited

U.S. PATENT DOCUMENTS 4,065,988 A * 1/1978 Lohneis et al. ................. 82/125
4,999,894 A * 3/1991 Berry et al. ..................... 29/33 P (Continued)

FOREIGN PATENT DOCUMENTS

| DE | 19634575 A1 | 3/1998 |
|---|---|---|
| DE | 10064416 A1 | 7/2002 |

(Continued)

OTHER PUBLICATIONS

German Examination Report DE102008031487.0-14, dated Apr. 27, 2009, 4 pages.

(Continued)

Primary Examiner — Crystal J Barnes-Bullock
(74) Attorney, Agent, or Firm — Reising Ethington P.C.

(57) ABSTRACT

A machining installation for workpieces comprises a workpiece positioning device comprising a workpiece holder pivot unit as well as a tool positioning device comprising a tool holder pivot unit. The workpiece holder pivot unit is designed such that a workpiece holder is pivotable about at least three and no more than four workpiece holder pivot axes. Moreover, the tool holder pivot unit is designed such that a tool holder is pivotable about no more than two tool holder pivot axes. The machining installation has a simple design and ensures flexible and accurate machining of workpieces.

16 Claims, 11 Drawing Sheets

(56) References Cited

U.S. PATENT DOCUMENTS

| | | | |
|---|---|---|---|
| 5,342,275 A * | 8/1994 | Yanase et al. | 483/1 |
| 5,831,734 A * | 11/1998 | Van Tooren et al. | 356/620 |
| 6,070,335 A | 6/2000 | Pritschow | |
| 6,190,294 B1 * | 2/2001 | Okada et al. | 483/30 |
| 6,718,854 B2 * | 4/2004 | Bedi et al. | 82/118 |
| 7,137,940 B2 * | 11/2006 | Taniguchi et al. | 483/56 |
| 7,597,034 B2 * | 10/2009 | Liu et al. | 82/1.11 |
| 7,614,742 B2 * | 11/2009 | Mandler et al. | 351/159.8 |
| 2001/0022098 A1 * | 9/2001 | Wirz | 72/17.3 |
| 2006/0048364 A1 | 3/2006 | Zhang et al. | |

FOREIGN PATENT DOCUMENTS

| | | |
|---|---|---|
| EP | 0381602 A1 | 8/1990 |
| EP | 0779126 A1 | 6/1997 |
| EP | 0812652 A1 | 12/1997 |
| EP | 1155771 A2 | 11/2001 |
| WO | 91/04522 | 4/1991 |

OTHER PUBLICATIONS

International Search Report PCT/EP2009/004746, dated Oct. 8, 2009, 13 pages.

* cited by examiner

Fig. 11

MACHINING INSTALLATION FOR WORKPIECES

This application is a National Stage entry under 35 USC 371 of International Application PCT/EP2009/004746, filed Jul. 1, 2009, which claims foreign priority benefits under 35 USC 119 of German Application No. 102008031487.0, filed Jul. 3, 2008. The disclosure of each is expressly incorporated by reference herein in its entirety.

BACKGROUND OF THE INVENTION

1. Field of the Invention

The invention relates to a machining installation for workpieces.

2. Background Art

A machining installation for workpieces designed as a machine tool is known from EP 1 155 771 A2. Several slides, which are displaceable along associated guide rails, are provided for positioning the workpiece holder and the tool spindle. The machine tool is loaded by means of a transport device which supplies the workpiece holders with the workpieces arranged thereon to one of the slides and picks them up again after machining. Although the described machine tool allows a high machining accuracy to be achieved, the fabrication of the machine tool is however difficult and expensive.

SUMMARY OF THE INVENTION

It is therefore the object of the invention to provide a machining installation for workpieces which has a simple design and allows flexible and accurate machining of workpieces.

This object is achieved by a machining installation for workpieces, the machining installation comprising a workpiece positioning device for positioning workpieces to be machined, the workpiece positioning device comprising a first base frame; a workpiece holder; and a workpiece holder pivot unit which is arranged between the first base frame and the workpiece holder, and which is designed such that the workpiece holder is pivotable about at least three and no more than four workpiece holder pivot axes; a tool positioning device for positioning tools provided for machining the workpieces, the tool positioning device comprising a second base frame; a tool holder, the tool holder being a work spindle unit comprising a work spindle which is drivable for rotation about a spindle axis; and a tool holder pivot unit which is arranged between the second base frame and the tool holder, and which is designed such that the tool holder is pivotable about no more than two tool holder pivot axes; and a position measuring unit provided for measuring an absolute position of the workpiece holder Since the workpiece positioning device and the tool positioning device are each equipped with a pivot unit, this ensures on the one hand that the pivot axes required for a flexible machining of the workpieces are provided, and on the other hand that the pivot axes are divided among two pivot units, thus ensuring accurate machining of the workpieces. The division of the pivot axes, and consequently, the limited number of pivoting elements of the respective pivot unit allows a substantially rigid design of the positioning devices. Due to the division of the pivot axes, the serial kinematic chains formed by the pivot units are short, ensuring that positioning errors in the respective kinematic chain will only be transmitted to a limited extent. Furthermore, the workpiece holder pivot unit ensures a large movement area for the workpiece positioning device so that the workpieces to be machined can easily be picked up and deposited after machining by means of the workpiece positioning device.

Moreover, the machining installation has a simple design and can therefore be fabricated at relatively low cost. The workpiece positioning device may for instance be an industrial robot which, compared to conventional industrial robots, is equipped with a reduced number of pivot axes. The inaccurate serial kinematic chain of a conventional industrial robot is interrupted due to the reduced number of pivot axes, with the workpiece positioning device providing the additional pivot axes. The division of the pivot axes and therefore of the kinematic chain allows the industrial robot to be used for machining workpieces as the industrial robot provides sufficient stability and rigidity to ensure high machining accuracy. The positioning devices are preferably arranged on a common sub-frame, thus allowing for on-site adjustment and calibration.

A workpiece holder pivot unit which is designed such that a first workpiece holder pivot member is arranged on the first base frame for pivoting movement about a first vertical workpiece holder pivot axis; a second workpiece holder pivot member is mounted to the first workpiece holder pivot member for pivoting movement about a second horizontal workpiece holder pivot axis; a third workpiece holder pivot member is mounted to the second workpiece holder pivot member for pivoting movement about a third horizontal workpiece holder pivot axis; and the workpiece holder is mounted to the third workpiece holder pivot member provides for a plurality of machining positions for the workpieces held by the workpiece holder. The workpiece holder pivot unit further ensures a large movement area for the workpiece holder so that the workpiece positioning unit is flexibly usable for loading the machining installation with workpieces. The workpiece holder pivot unit is advantageously designed such that the first workpiece holder pivot member is pivotable through 360° about the associated first workpiece holder pivot axis. This ensures high flexibility when loaded with workpieces. When the workpiece holder pivot unit is designed in this manner, industrial robots are usable as workpiece positioning device. The industrial robots must only be reduced to the maximum number of workpiece holder pivot axes.

A workpiece holder pivot unit comprising exactly three workpiece holder pivot axes has a simple and rigid design.

A design where the workpiece holder is rigidly mounted to the third workpiece holder pivot member ensures high machining accuracy.

A workpiece holder pivot unit comprising exactly four workpiece holder pivot axes provides for high flexibility when positioning the workpieces to be machined while ensuring sufficient stability and rigidity of the workpiece holder pivot unit.

A development where the workpiece holder is mounted to the third workpiece holder pivot member for pivoting movement about a fourth workpiece holder pivot axis, with the fourth workpiece holder pivot axis being a central longitudinal axis of the third workpiece holder pivot member provides a fourth workpiece holder pivot axis which does not substantially impair the stability and rigidity of the workpiece holder pivot unit. The workpiece holder is in particular pivotable through 360° about the fourth workpiece holder pivot axis, thus allowing maximum flexibility when positioning the workpieces to be machined. The design of the workpiece positioning device corresponds to that of an industrial robot which is reduced to four pivot axes.

A tool holder pivot unit which is designed such that a first tool holder pivot member is arranged on the second base frame for pivoting movement about a first horizontal tool holder pivot axis; a second tool holder pivot member is mounted to the first tool holder pivot member for pivoting movement about a second vertical tool holder pivot axis; and the tool holder is mounted to the second tool holder pivot member provides for high flexibility when positioning the tool holder. Moreover, the tool holder pivot unit has high stability and rigidity. The second tool holder pivot member is advantageously pivotable through 360° about the associated second tool holder pivot axis. The second tool holder pivot axis extends substantially vertically relative to the first tool holder pivot member and is pivotable together with said first tool holder pivot member about the horizontal first tool holder pivot axis. The tool positioning device may for instance be a rotary/pivoting table. The rotary/pivoting table may be supported on one or two sides.

A tool holder pivot unit which is designed such that a tool holder pivot member is arranged on the second base frame for pivoting movement about a tool holder pivot axis extending vertically relative to the second base frame; and the tool holder is mounted to the tool holder pivot member for pivoting movement about a second horizontal tool holder pivot axis has a simple design and ensures high flexibility when positioning the tool holder. Moreover, the tool holder pivot unit has high stability and rigidity. The tool holder pivot member is preferably pivotable through 360° about the associated first tool holder pivot axis. Furthermore, the tool holder is preferably pivotable through at least 90° about the second tool holder pivot axis, thus allowing an automated tool change to take place. The tool holder is preferably supported on both sides in the fork-shaped tool holder pivot member. Alternatively, the tool holder may only be supported on one side at a correspondingly formed protrusion of the tool holder pivot member.

A tool holder pivot unit comprising exactly two tool holder pivot axes allows extremely flexible machining of workpieces.

A design of the position measuring unit as mechanical measuring kinematics is simple, rigid, highly dynamic and accurate. A force-flow-free, mechanical measuring kinematics allows the absolute position to be measured with an accuracy of less than 20 µm. If the measuring kinematics is designed as a λ-kinematics, the absolute position is measurable with an accuracy of approximately 5 µm. A force-flow-free, mechanical measuring kinematics is for example achievable using rods of constant length, telescopic rods, and in the form of a knee lever kinematics or a λ-kinematics. Furthermore, the mechanical measuring kinematics may be designed as a joint arm comprising rotary encoders disposed in the revolute joints.

A development where the mechanical measuring kinematics is detachably mounted to the workpiece positioning device ensures a free movement area for the workpiece positioning unit. Despite the mechanical measuring kinematics, the workpiece positioning unit is usable for loading the machining installation at all times. The mechanical measuring kinematics is preferably detachably mounted to the third workpiece holder pivot member near the workpiece holder.

A support frame for the mechanical measuring kinematics which is mounted on a common sub-frame together with the workpiece holder positioning device and the tool holder positioning device ensures easy mounting of the mechanical measuring kinematics. The positioning devices and the support frame together with the mechanical measuring kinematics are arranged on the common sub-frame, thus resulting in high measuring accuracy.

A development where a tool magazine and a tool changer interacting with said tool magazine and the tool holder are provided which are arranged on a common sub-frame together with the workpiece holder positioning device and the tool holder positioning device allows flexible machining of workpieces. The tool magazine allows a plurality of workpieces to be provided. The tool change is performed using the tool changer. The tool magazine is preferably mounted to the side of the tool positioning device facing away from the working area, with the tool changer being situated between the tool magazine and the tool positioning device below the H- or U-shaped support frame for the mechanical measuring kinematics.

A work spindle where the spindle axis is displaceable relative to the spindle housing allows positioning errors to be corrected by displacing the spindle axis relative to the spindle housing. The work spindle unit may be of random design as long as the work spindle is sufficiently displaceable relative to the spindle housing at a sufficient speed in order to correct positioning errors. Displacing the spindle axis may for instance be performed in such a way that the work spindle is supported in the spindle housing via at least one magnetic bearing, with the spindle axis being pivotable when the magnetic bearing is actuated accordingly. Alternatively, the work spindle may be supported in the spindle housing in such a way that the spindle axis is radially displaceable relative to a longitudinal housing axis.

A computing unit which is coupled with the position measuring unit and the work spindle unit; and which is designed such that positioning errors of the workpiece holder are compensable allows simple and accurate compensation of positioning errors, thus ensuring high-precision machining of workpieces.

A computing unit comprising a computed model of the workpiece positioning device is provided, with positioning errors of the workpiece holder being detectable and compensable by means of the computed model allows the machining accuracy to be increased as positioning errors, which are for instance due to machining forces, are foreseeable by means of the computing unit and are therefore compensable at an early stage.

Further features, advantages and details of the invention will become apparent from the ensuing description of several embodiments by means of the drawing.

DESCRIPTION OF THE PREFERRED EMBODIMENT

The following is a description, with reference to FIGS. 1 to 4, of a first embodiment of the invention. A machining installation 1 for machining workpieces 2 comprises a workpiece positioning device 3 and a tool positioning device 4. The positioning devices 3, 4 are mounted on a common sub-frame 5 at a distance from each other. The sub-frame 5 is mounted on a base plate 6. Alternatively, the positioning devices 3, 4 may be mounted directly on the base plate 6.

Figure 1:
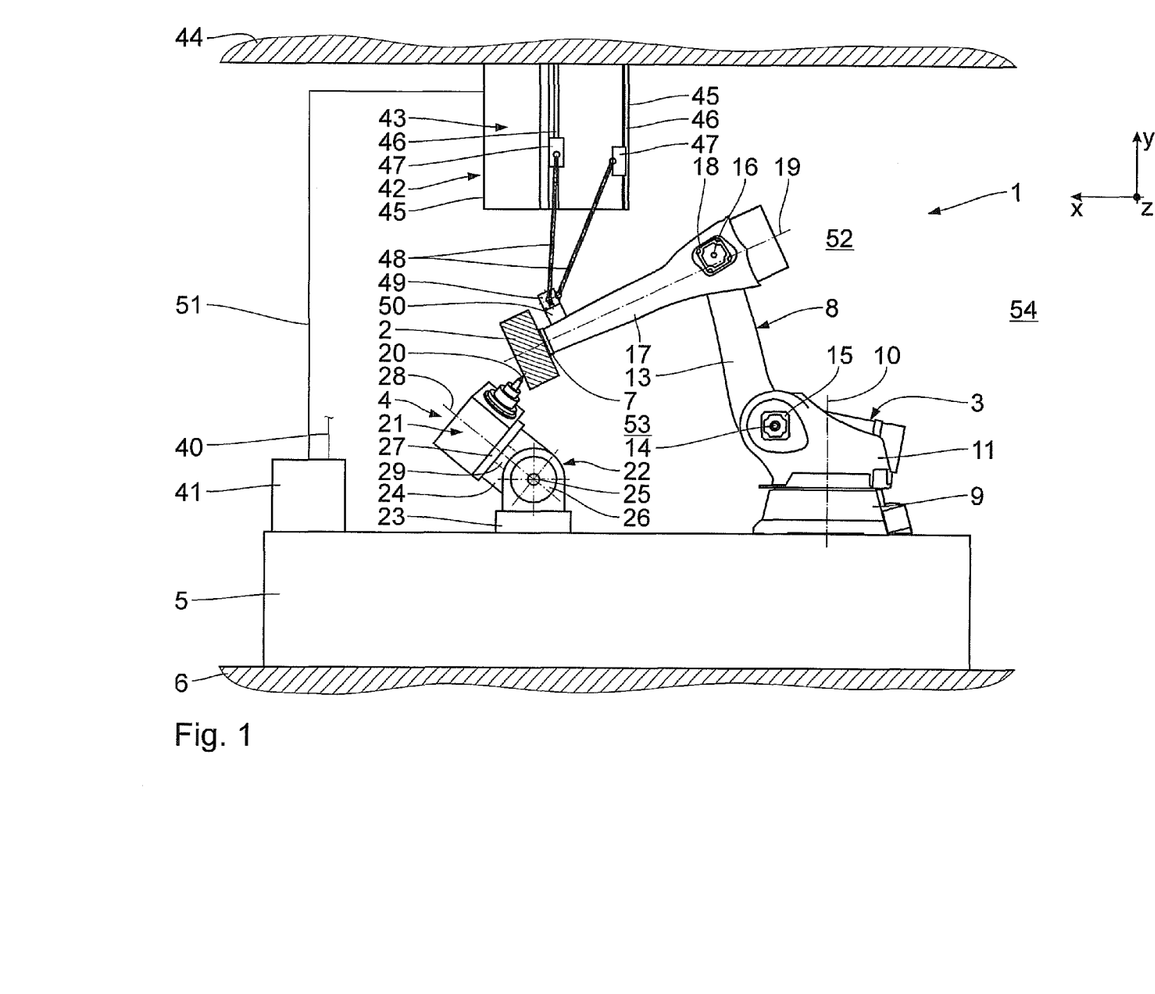
FIG. 1 is a side view of a machining installation according to a first embodiment in a machining state.
Figure 2:
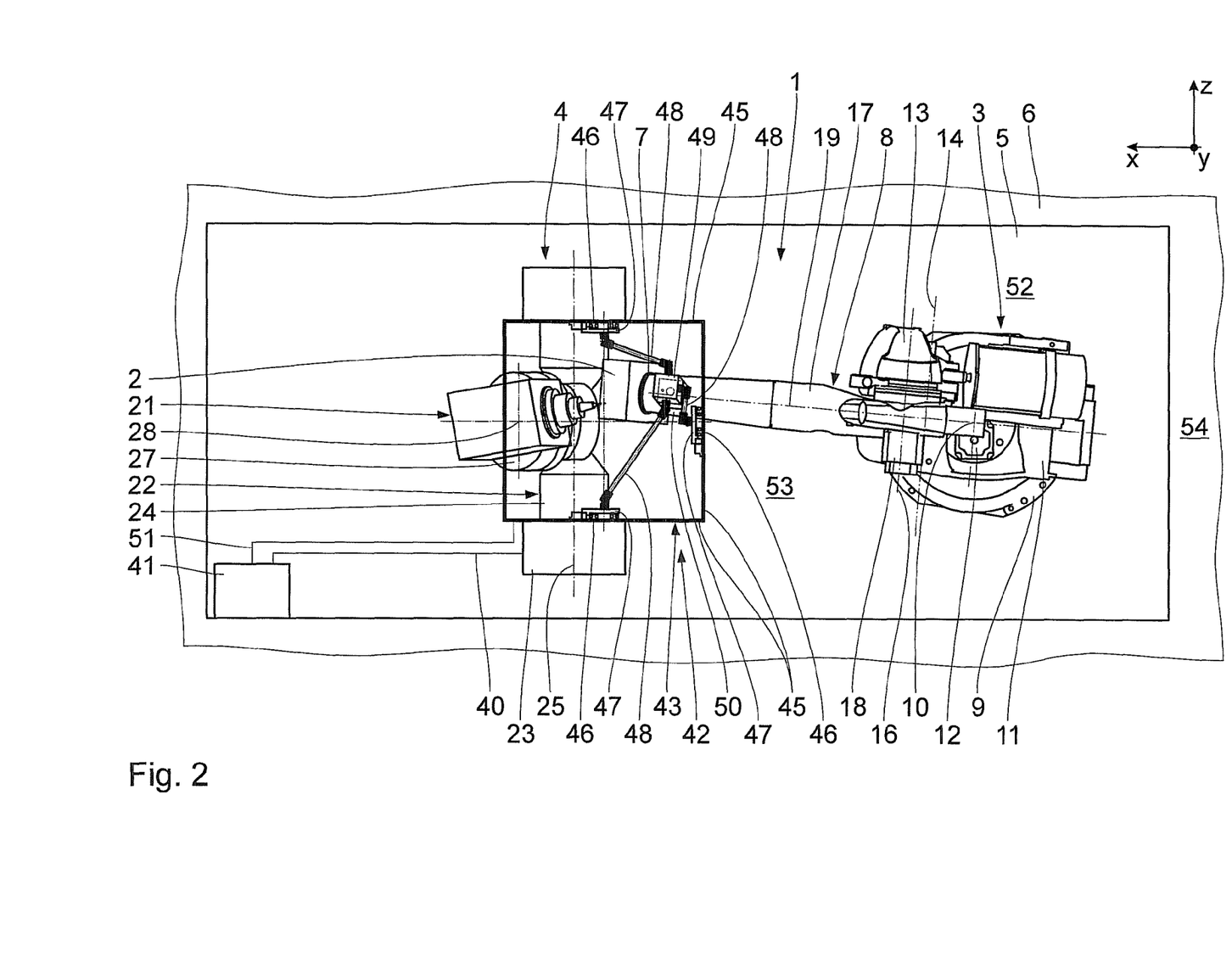
FIG. 2 is a plan view of the machining installation in FIG. 1.
Figure 3:
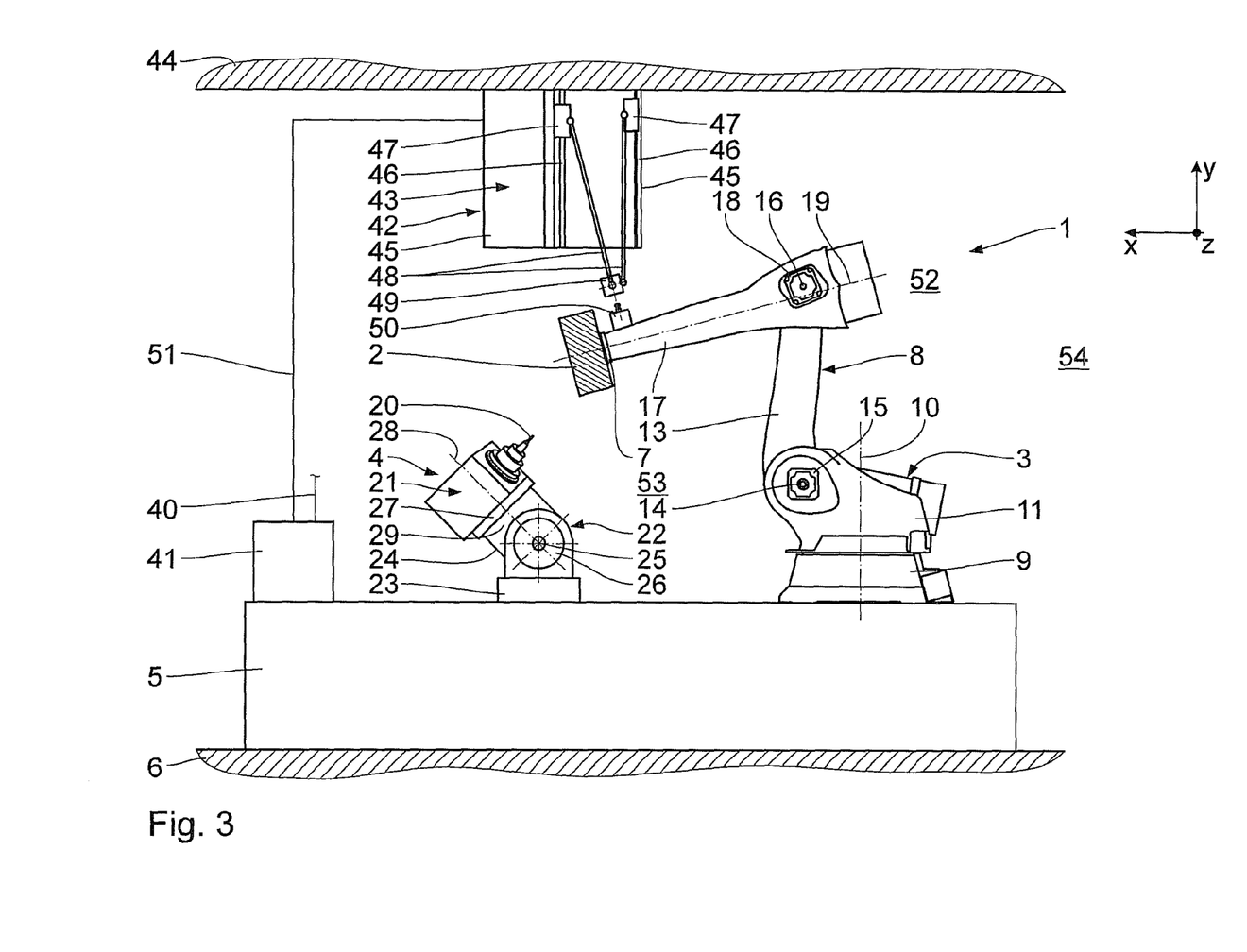
FIG. 3 is a side view of the machining installation in FIG. 1 in a loading state.

The workpiece positioning device 3 is used for positioning the workpieces 2 to be machined and is designed in the manner of an industrial robot. The workpiece positioning device 3 comprises a workpiece holder 7 for receiving and holding the workpieces 2, the workpiece holder 7 being pivotably arranged on a base frame 9 via a workpiece holder pivot unit 8. The base frame 9 is mounted on the sub-frame 5. For pivoting the workpiece holder 7 about a vertical first workpiece holder pivot axis 10, the workpiece holder pivot unit 8 comprises a first workpiece holder pivot member 11 in the form of a horizontal rotating table which is pivotably arranged on the base frame 9 via a first workpiece holder pivot drive 12. The first workpiece holder pivot member 11 is pivotable through 360° about the first workpiece holder pivot axis 10.

Further provided for pivoting the workpiece holder 7 is a second workpiece holder pivot member 13 in the form of a robot arm which is mounted to the end of the first workpiece holder pivot member 11 for pivoting movement about a second horizontal workpiece holder pivot axis 14. Pivoting the second workpiece holder pivot member 13 is performed by means of a second workpiece holder pivot drive 15.

Further provided for pivoting the workpiece holder 7 about a horizontal third workpiece holder pivot axis 16 is a third workpiece holder pivot member 17 in the form of a robot arm. The workpiece holder pivot members 13 and 17 are attached to each other at their respective free ends. The workpiece holder 7 is rigidly mounted to a free end of the third workpiece holder pivot member 17 remote from the second workpiece holder pivot member 13. Pivoting the third workpiece holder pivot member 17 takes place using a third workpiece holder pivot drive 18.

The third workpiece holder pivot member 17 has a central longitudinal axis 19 about which the workpiece holder 7 is not pivotable because of the rigid mounting to the third workpiece holder pivot member 17. The workpiece holder pivot unit 8 therefore has exactly three workpiece holder pivot axes 10, 14 and 16 which are provided by the exactly three workpiece holder pivot members 11, 13 and 17.

The tool positioning device 4 is used for positioning tools 20 required for machining the workpieces 2 and is designed as a rotary/pivoting table. The tool positioning device 4 comprises a tool holder 21 for receiving and holding the tools 20, the tool holder 21 being pivotably arranged on another base frame 23 by means of a tool holder pivot unit 22. The base frame 23 is mounted on the sub-frame 5.

The tool holder pivot unit 22 comprises a first tool holder pivot member 24 in the form of a pivoting table which is arranged on the base frame 23 for pivoting movement about a first horizontal tool holder pivot axis 25. The first tool holder pivot member 24 is supported by the base frame 23 on two sides. Alternatively, the first tool holder pivot member 24 may be supported by the base frame 23 on one side only. A first tool holder pivot drive 26 is provided for pivoting the first tool holder pivot member 24. A second tool holder pivot member 27 is mounted to the first tool holder pivot member 24 for pivoting movement about a second vertical tool holder pivot axis 28. The second tool holder pivot member 27 is pivotable through 360° about the second tool holder pivot axis 28 by means of a second tool holder pivot drive 29. The second tool holder pivot member 27 is in particular a rotary disk which is arranged centrally on the pivoting table. The tool holder 21 is rigidly mounted to the second tool holder pivot member 27. The tool holder pivot unit 22 therefore has exactly two tool holder pivot axes 25, 28 which are provided by the exactly two tool holder pivot members 24, 27.

The machining installation 1 therefore has a total of five pivot axes 10, 14, 16, 25, 28 for machining tools 2.

The tool holder 21 is designed as a work spindle unit allowing rotary drive of the tools 20. The tool holder is hereinafter referred to as work spindle unit 21.

Figure 4:
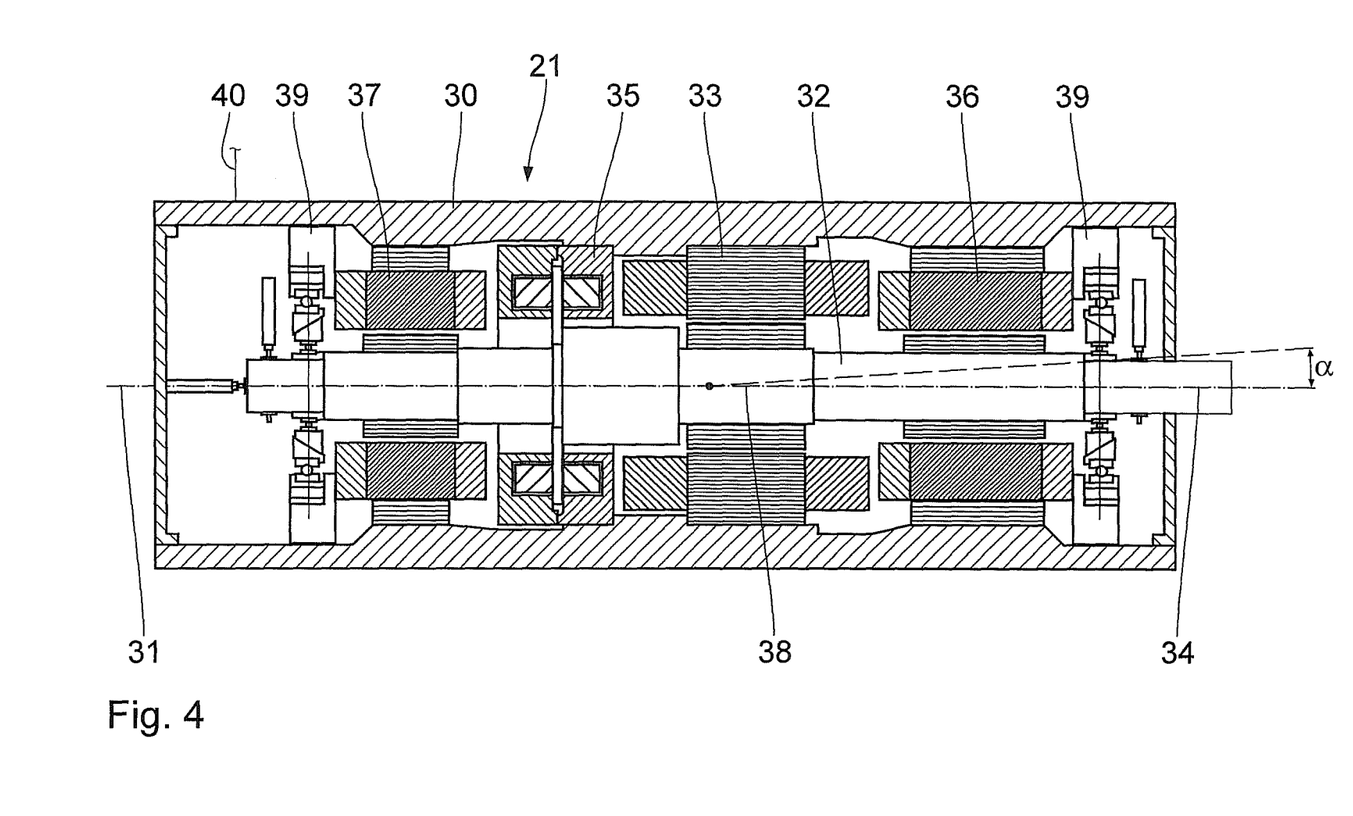
FIG. 4 is a schematic longitudinal section through a work spindle unit of the machining installation of FIG. 1.

The work spindle unit 21 comprises a spindle housing 30 having a centrally extending longitudinal housing axis 31. In the spindle housing 30 is mounted a work spindle 32 which is drivable for rotation about a spindle axis 34 by means of a spindle drive 33. In FIG. 4, the spindle axis 34 coincides with the longitudinal housing axis 31. The work spindle 32 is supported by means of an axial bearing 35 as well as a first radial bearing 36 and a second radial bearing 37. The axial bearing 35 is arranged between the radial bearings 36 and 37.

The work spindle unit 21 is designed such that the spindle axis 34 is displaceable relative to the spindle housing 30. To this end, the radial bearings 36, 37 are for instance designed as electrically actuable magnetic bearings allowing the spindle axis 34 to be pivoted about an axial center of gravity 38 disposed centrally between the radial bearings 36, 37. The spindle axis 34 is thus displaceable relative to the longitudinal housing axis 31 about an axial pivot angle α. The axial pivot angle α is schematically shown in FIG. 4.

For measuring the position and alignment of the spindle axis 34, there are provided several measuring elements 39 which are mounted to the free ends of the work spindle 32 between said work spindle 32 and the spindle housing 30. The radial bearings 36, 37 are arranged between the measuring elements 39. The measuring elements 39 are connected to a computing unit 41 via a signal line 40.

A position measuring unit 42 is provided for measuring an absolute position of the workpiece holder 7 in an x-, y-, and z-direction. The position measuring unit 42 comprises a rectangular base frame 43 which is mounted to a cover plate 44 approximately above the tool positioning device 4. The base frame 43 is open toward the positioning devices 3, 4 and is formed by four side walls 45. On the side wall 45 facing the workpiece positioning device 3 and on the side walls 45 adjacent thereto, there is in each case arranged one vertical guide rail 46. Each of the guide rails 46 is equipped with one measuring slide 47 which is mounted for displacement along the respective guide rail 46. Each of the measuring slides 47 is equipped with a rod 48 the free end of which is in each case rotary-articulated to the respective measuring slide 47. The respective second free end of each rod 48 is rotary-articulated to a first connection member 49. The first connection member 49 is detachably mounted to a second connection member 50. The second connection member 50 is mounted to the third workpiece holder pivot member 17 near the workpiece holder 7. The guide rails 46, the measuring slides 47, the rods 48 and the connection members 49, 50 form a force-flow-free mechanical measuring kinematics allowing the absolute position of the workpiece holder 7 to be measured. The position measuring unit 42 is connected to the computing unit 41 via a signal line 51.

The computing unit 41 is coupled to the work spindle unit 21 and the position measuring device 42 via the signal lines 40, 51. The computing unit 41 is designed such that positioning errors of the workpiece holder 7 relative to the work spindle unit 21, in particular relative to the tool 20 received therein, are compensable. Additionally, a computed model of the workpiece positioning device 3 and/or the tool positioning device 4 may be implemented in the computing unit 41, the computed model allowing positioning errors of the workpiece holder 7 relative to the work spindle unit 21, in particular relative to the tool 20 received therein, to be detected and compensated.

The workpiece holder pivot unit 8 provides a movement area 52 for the workpiece positioning device 3, the movement area 52 being usable for machining workpieces 2 and for loading the machining installation 1 with workpieces 2. The movement area 52 may accordingly be divided into a working area 53 arranged between the positioning devices 3, 4 and a loading area 54 arranged substantially opposite to the working area 53.

The following is a description of the mode of operation of the machining installation 1.

Prior to the machining of workpieces 2, the machining installation 1 needs to be calibrated. To this end, the computing unit 41 defines various positions for the positioning devices 3, 4 to approach. Having reached their respective positions, these positions are measured and compared to the defined positions. In the event of deviations between the defined and measured positions, the corresponding control parameters in the computing unit 41 are corrected.

Moreover, correction factors are stored in the computing unit 41 by means of which the control parameters are modified depending on the ambient temperature so as to perform a temperature compensation.

FIGS. 1 and 2 show a machining state of the machining installation 1. The workpiece 2 to be machined is held by the workpiece holder 7 and is pivoted about the workpiece holder pivot axes 10, 14, 16 to the extent required by means of the workpiece holder pivot unit 8. The tool 20 required for machining the workpiece 2 is received in the work spindle unit 21 and is pivoted about the tool holder pivot axes 25, 28 to the desired position by means of the tool holder pivot unit 22. When the workpiece 2 is being machined, the position measuring unit 42 continuously provides measured values of the absolute position of the workpiece holder 7 in the x-, y-, and z-directions to the computing unit 41. Machining forces may however cause positioning errors of the workpiece holder 7. Therefore, the computing unit 41 continuously compares the measured values for the absolute position of the workpiece holder 7 with the desired values for the absolute position of the workpiece holder 7 so that positioning errors are detected.

In the event of positioning errors, the computing unit 41 actuates the electromagnetically actuable radial bearings 36, 37 in such a way that the spindle axis 34 is pivoted and aligned about the axial centre of gravity 38 for displacement through a particular axial pivot angle α such that the positioning errors are compensated. This ensures a positioning accuracy of the workpiece 2 of at least 20 μm and an orientation accuracy of at least 0.5°.

If a computed model is implemented in the computing unit 41, the positioning errors to be expected are detectable prior to the actual machining and compensable by corresponding actuation of the positioning devices 3, 4. This improves the position and orientation accuracy.

The forces and momenta occurring during machining cause vibrations which would have a negative effect on the machining accuracy of the workpiece 2 without corresponding measures. Vibrations in the frequency range above approx. 30 Hz do not occur due to the rigidity of the positioning devices 3, 4. A high rigidity is in particular achieved by the design of the workpiece positioning device 3 having only three workpiece holder pivot axes 10, 14, 16. Vibrations in the frequency range of approx. 2 Hz to 30 Hz are compensated by the work spindle unit 21 via the electromagnetically actuable radial bearings 36, 37. Vibrations in the frequency range of less than approx. 2 Hz are compensated by compensating movements of the workpiece positioning device 3 and/or the tool positioning device 4. The machining installation 1 thus provides five axes for machining the workpiece 2 with high machining accuracy.

After machining the workpiece 2, the position measuring unit 42 is decoupled from the workpiece positioning device 3. To this end, the first connection member 49 is detached from the second connection member 50.

This loading state is shown in FIG. 3. The workpiece positioning device 3 is now able to move the workpiece 2 from the working area 53 to the loading area 54 where it is deposited on a pallet or a transport belt, for example. After depositing the finished workpiece 2, the workpiece positioning device 3 picks up a new workpiece 2 and moves from the loading area 54 back to the working area 53. In the working area 53, the position measuring unit 42 is coupled to the workpiece positioning device 3 again by connecting the first connection member 49 to the second connection member 50. The new workpiece 2 is now ready for machining. The large movement area 52 also allows the workpiece positioning device 3 to be used for flexible loading.

Figure 5:
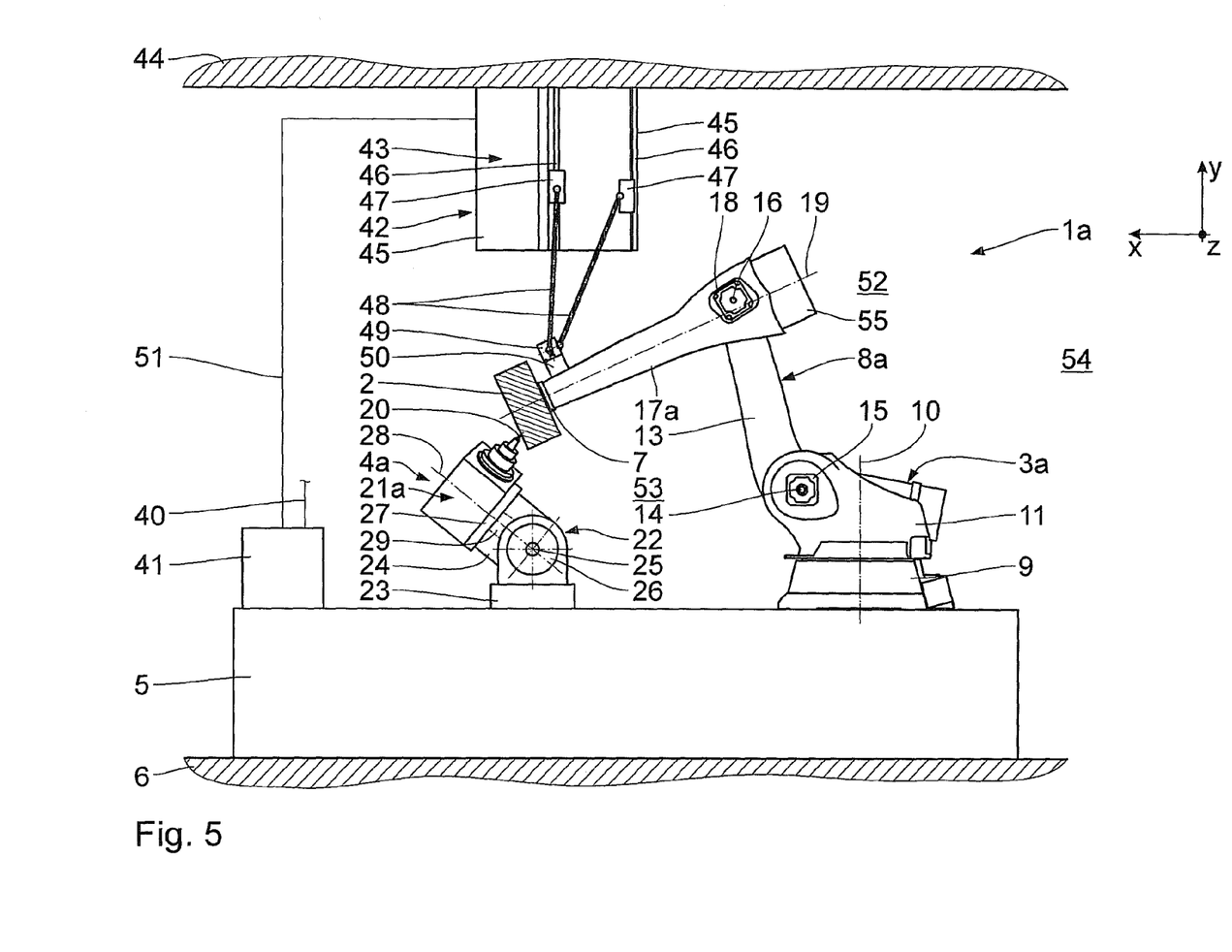
FIG. 5 is a side view of a machining installation according to a second embodiment in a machining state.

The following is a description, with reference to FIG. 5, of a second embodiment of the invention. Identically designed parts have the same reference numerals as in the first embodiment to the description of which reference is made. Differently designed parts with the same function have the same reference numerals with a subsequent a. The main difference compared to the first embodiment is that the workpiece holder pivot unit 8a is designed such that the workpiece holder 7 is pivotable about the central longitudinal axis 19. The central longitudinal axis 19 therefore forms a fourth workpiece holder pivot axis. The central longitudinal axis is hereinafter referred to as fourth workpiece holder pivot axis 19. For pivoting the workpiece holder 7 about the fourth workpiece holder pivot axis 19, there is provided a fourth workpiece holder pivot drive 55 which is arranged opposite to the workpiece holder 7 on the third workpiece holder pivot member 17a. The workpiece holder pivot unit 8a of the workpiece positioning device 3a therefore has exactly four workpiece holder pivot axes 10, 14, 16 and 19. The machining installation 1a therefore has a total of six pivot axes 10, 14, 16, 19, 25, 28 for machining workpieces 2.

Furthermore, the work spindle unit 21a of the tool positioning device 4a is designed such that the spindle axis 34 is displaceable radially with respect to the longitudinal housing axis 31. A work spindle unit 21a of this type is for instance described in U.S. Pat. Nos. 5,971,678, 6,663,327 B2 and 7,189,038 B2 to which reference is made. The spindle axis 34 is therefore radially displaceable in all directions substantially parallel to the longitudinal housing axis 31 for compensation of positioning errors.

The fourth workpiece holder pivot axis 19 allows greater flexibility when positioning the workpiece 2 to be machined.

The position errors measured by means of the position measuring unit 42 are compensable by the work spindle unit 21a. To this end, the computing unit 41 actuates the work spindle unit 21a in such a way that the work spindle 32, together with the associated spindle axis 34, is displaced radially to the longitudinal housing axis 31 for compensation of the positioning errors. For a description of the further mode of operation, reference is made to the description of the first embodiment.

Figure 6:
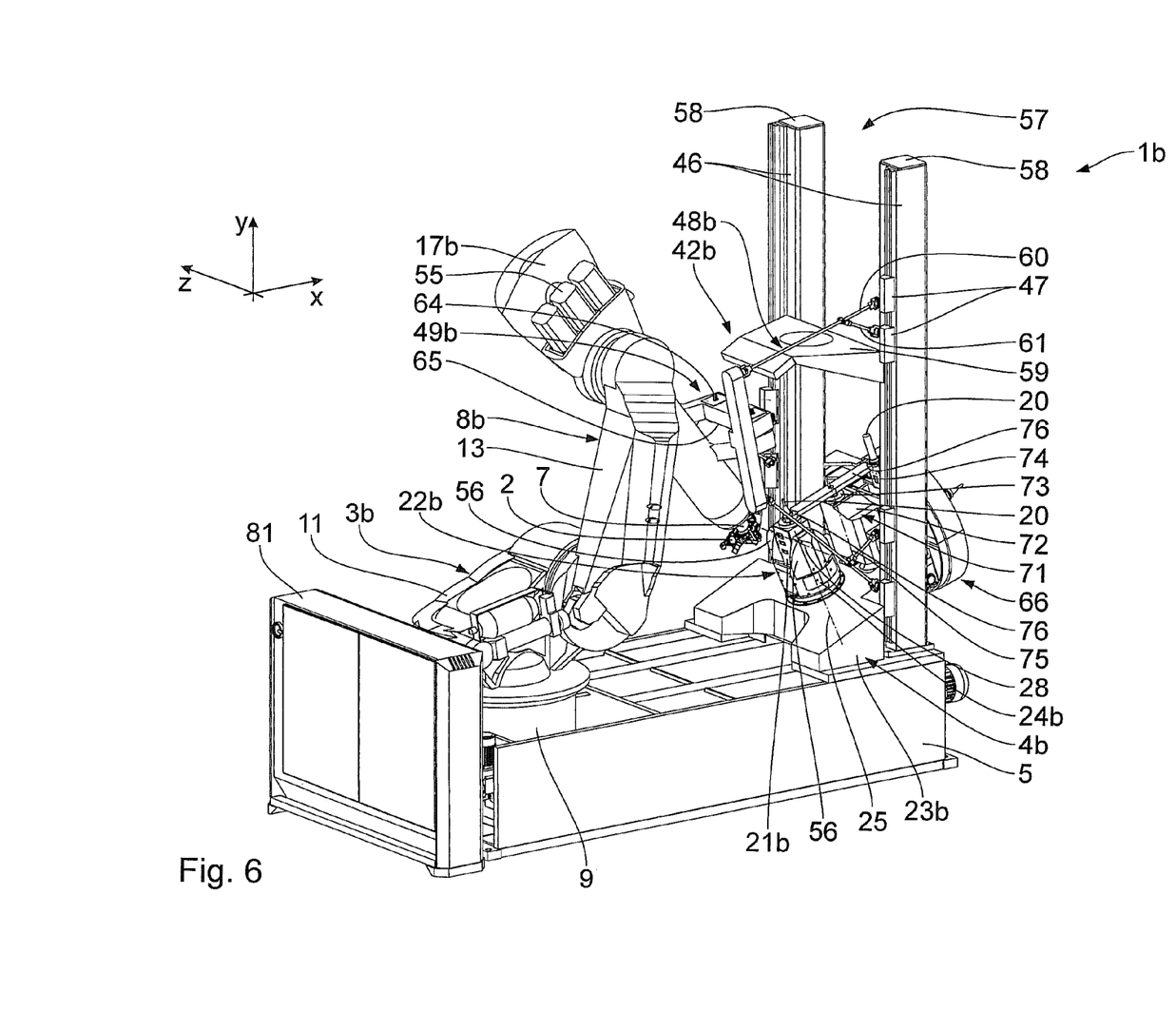
FIG. 6 is a perspective view of a machining installation according to a third embodiment in a machining state.
Figure 7:
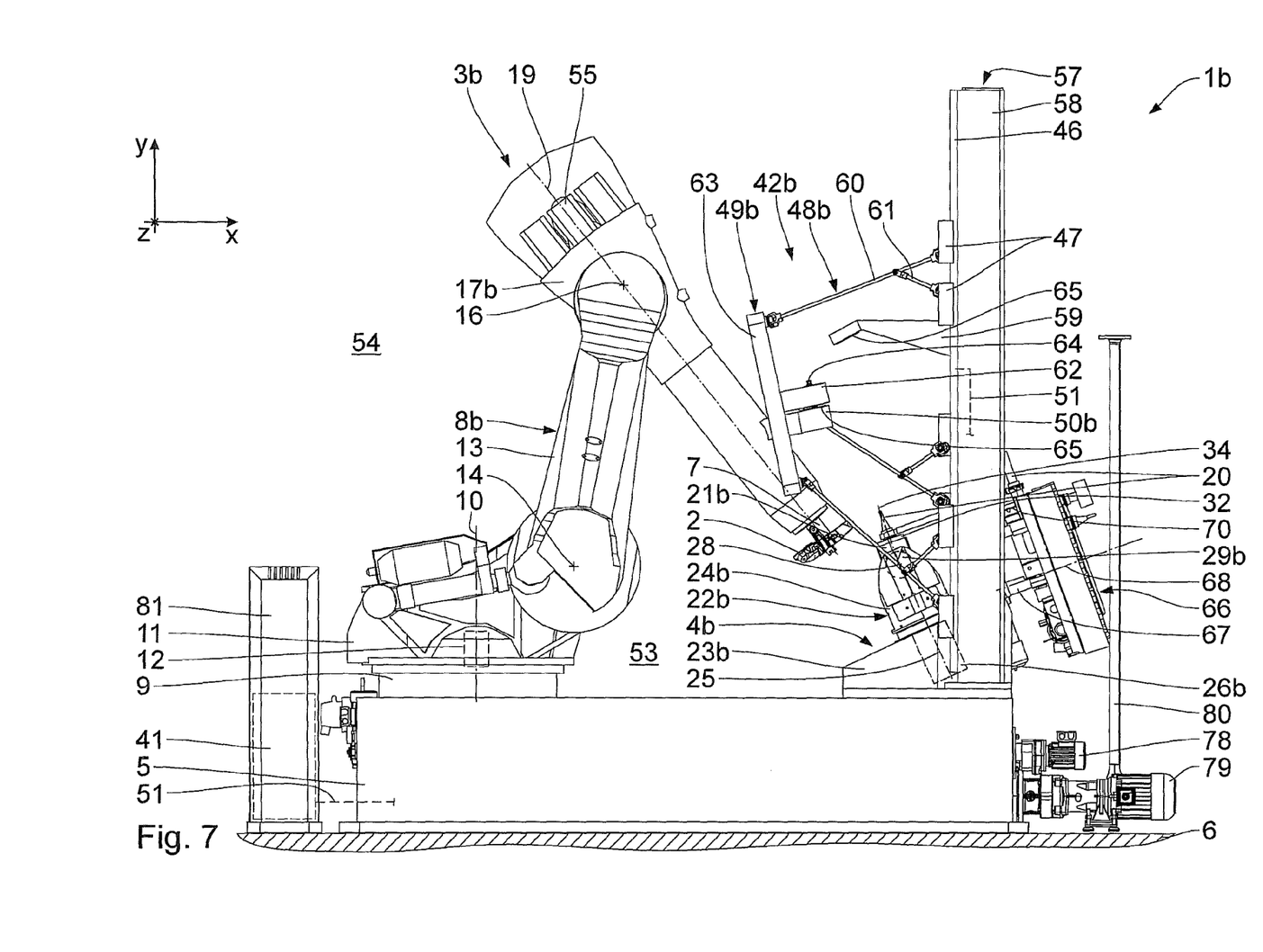
FIG. 7 is a side view of the machining installation of FIG. 6.
Figure 8:
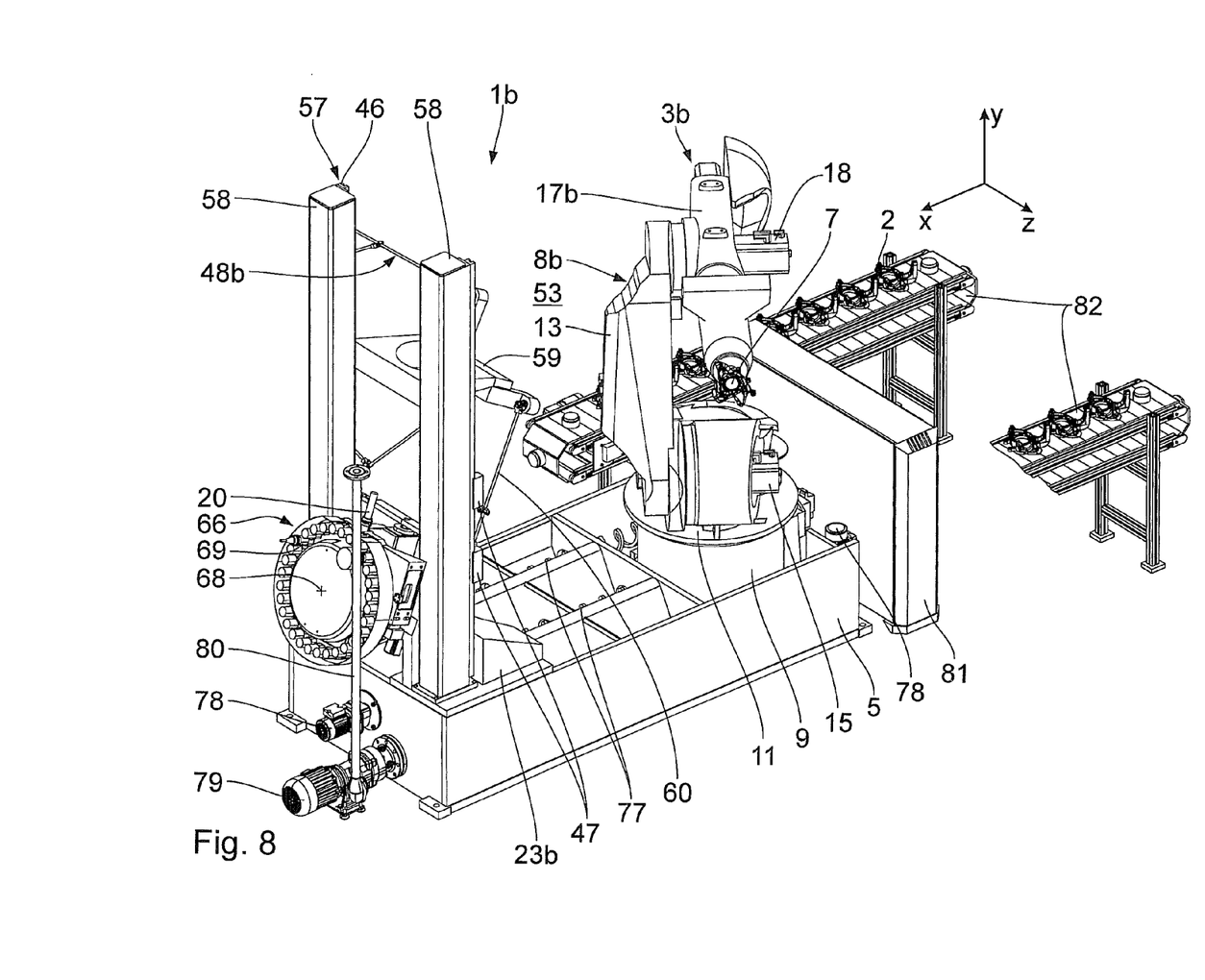
FIG. 8 is a perspective view of the machining installation of FIG. 6 in a loading state.

The following is a description of a third embodiment of the invention with reference to FIGS. 6 to 8. Identically designed parts have the same reference numerals as in the preceding embodiments to the description of which reference is made. Differently designed parts with the same function have the same reference numerals with a subsequent b. The design of the workpiece positioning device 3b corresponds to the second embodiment and comprises exactly four workpiece holder pivot axes 10, 14, 16 and 19. Corresponding to the preceding embodiments, the tool positioning device 4b comprises exactly two tool holder pivot axes 25, 28 for pivoting the work spindle unit 21b relative to the second base frame 23b. The tool holder pivot unit 22b comprises a tool holder pivot member 24b which is arranged on the wedge-shaped base frame 23b for pivoting movement about the first tool holder pivot axis 25. The first tool holder pivot axis 25 is perpendicular to the mounting surface of the base frame 23b and is inclined relative to the y-direction through the inclination angle of the mounting surface. The tool holder pivot member 24b is fork-shaped and comprises two spaced fork portions 56. Between the fork portions 56, the work spindle unit 21b is mounted for pivoting movement about the second horizontal tool holder pivot axis 28. A tool holder pivot drive 29b is integrated in each of the fork portions 56 for pivoting the work spindle unit 21b. Compared to the preceding embodiments, the spindle axis 34 of the work spindle 32 is not displaceable relative to the spindle housing 30.

The position measuring unit 42b is a mechanical λ-kinematics. At the end of the sub-frame 5 is arranged a support frame 57 for mounting the position measuring unit 42b. The support frame 57 is in the shape of an H and comprises two vertical girders 58 which are approximately centrally interconnected by a horizontal girder 59. The horizontal girder 59 protrudes relative to the vertical girders 58 in the direction of the working area 53. On each of the vertical girders 58 is arranged a guide rail 46. The measuring slides 47 of the rods 48b are arranged for displacement along said guide rails 46. The rods 48b are in the shape of a λ, each of which comprising a first long rod portion 60 and a second short rod portion 61. The first free end of each of the long rod portions 60 is rotary-articulated to one of the measuring slides 47 while the second free ends thereof are rotary-articulated to the first connection member 49b. The first free end of each of the short rod portions 61 is rotary-articulated to another measuring slide 47 while the second free ends thereof are rotary-articulated to the respective associated long rod portion 60. The connection member 49b is substantially in the shape of a T, comprising a horizontal connection leg 62 and a vertical connection leg 63 centrally attached thereto. The respective ends of two of the three rods 48b are articulated to the vertical connection leg 63 while the end of the remaining third rod 48b is articulated to the horizontal connection leg 62. Therefore, two of the rods 48b are articulated to the vertical girder 58 associated to the vertical connection leg 63 whereas the remaining third rod 48b is articulated to the vertical girder 58 associated to the horizontal connection leg 62. The upper and lower sides of the horizontal connection leg 62 are in each case equipped with two retaining pins 64. The retaining pins 64 may be latched into associated retaining receptacles 65 disposed on the protruding horizontal girder 59 and on the connection member 50b mounted to the third workpiece holder pivot member 17.

A tool magazine 66 is provided for providing a plurality of tools 20, the tool magazine 66 being mounted to the sub-frame 5 on a side of the support frame 57 remote from the working area 53. The tool magazine 66 is a disk magazine which is rotatable about a magazine axis 68 by means of a magazine drive 67. The magazine axis 68 is substantially parallel to the mounting surface of the base frame 23b and substantially parallel to the x-y plane. On its periphery, the tool magazine 66 has a plurality of tool holders 69 which are arranged such that the central longitudinal axes of the tools 20 are substantially parallel to the magazine axis 68. The tool holders 69 are pivotable through approx. 90° by means of a holder drive 70 such that the central longitudinal axis of the respective pivoted tool 20 extends in a radial direction as shown in FIG. 8. The pivoting movement causes the tools 20 to move from their storage position to a transfer position. Alternatively, the tool holders 69 may already be arranged such that the central longitudinal axes of the tools 20 extend in a radial direction. A holder drive 70 for pivoting the tool holders 69 is then not required.

In the gap between the tool positioning device 4b and the tool magazine 66 and between the vertical girders 58 is arranged a tool changer 71. The tool changer 71 comprises a changer base frame 72 which is mounted on the mounting surface of the base frame 23b at a corresponding angle thereto. A changer drive 73, to which is mounted a changer arm 74, is integrated in the changer base frame 72. The changer arm 74 is pivotable by means of the changer drive 73 about a changer axis 75 which is substantially parallel to the first tool holder pivot axis 25. The changer arm 74 comprises a tool clamp 76 on each end for holding two tools 20.

Several chip conveyors 77 are integrated in the sub-frame 5 which are drivable for rotation by means of associated conveyor drives 78. Furthermore, a coolant pump 79 is mounted to the sub-frame 5 which pumps coolant to the work spindle unit 21b via conveyor lines 80. The computing unit 41 is arranged in a control cabinet 81. The control cabinet 81 is mounted on the base plate 6 next to the sub-frame 5. Alternatively, the control cabinet 81 may mounted to or on the sub-frame 5.

Two transport devices 82 in the form of transport belts are provided for transporting the workpieces 2 to and away from the machining installation 1 which may be arranged on both sides next to the sub-frame 5. Alternatively, both transport belts 82 may be arranged on one side of the sub-frame 5. Furthermore, only one transport belt 82 may be provided which transports the workpieces 2 to and away from the machining installation 1.

Machining of the workpieces 2 is principally performed as described above with respect to the preceding embodiments. The workpiece 2 to be machined and the tool 20 are pivoted to the extent required about the six pivot axes 10, 14, 16, 19, 25 and 28 by means of the workpiece holder pivot unit 8b and the tool holder pivot unit 22b. During the machining process, the position measuring unit 42b continuously provides measured values of the absolute position of the workpiece holder 7 in the x-, y-, and z-directions to the computing unit 41. The computing unit 41 continuously compares the measured values with the desired values for the absolute position of the workpiece holder 7 so that positioning errors are detected. In the event of positioning errors, the computing unit 41 actuates the pivot drives 12, 15, 18, 26, 29 and/or 55 in order to reposition the workpiece holder 7 and/or the work spindle unit 21. The λ-measuring kinematics allows high measuring accuracy, and accordingly, high machining accuracy to be achieved. If a computed model is implemented in the computing unit 41, the positioning errors to be expected are detectable and compensable by corresponding actuation of the positioning devices 3b, 4b.

After machining of the workpiece 2, the position measuring device 42b is decoupled. To this end, the retaining pins 64 of the first connection member 49b are latched into the associated retaining receptacles 65 of the horizontal girder 59 while the retaining receptacles 65 of the second connection member 50b are detached. This loading state is shown in FIG. 8. The workpiece positioning device 3b is now able to deposit the workpiece 2 on the transport belt 82 responsible for carry-off, and may then move to the transport belt 82 responsible for supplying the workpieces 2 in order to pick up a new workpiece 2 to be machined. Afterwards, the position measuring unit 42b is reconnected, allowing the new workpiece 2 to be machined.

In order to perform a tool change, the tool positioning device 4b is at first pivoted such that the spindle axis 34 is substantially parallel to the changer axis 75. When the desired tool 20 is in the transfer position, which is pivoted through 90°, the changer arm 74 is pivoted by means of the changer drive 73 in such a way that the first tool clamp 76 removes the worn-out tool 20 from the work spindle 32, and the second tool clamp 76 removes the new tool 20 from the tool magazine 66. Afterwards, the changer arm 74 is lifted in the usual manner in the direction of the changer axis 75, is pivoted through 180° about said axis, and lowered down again, allowing the worn-out tool 20 to be received in the tool receptacle 69 and the new tool 20 to be received in the work spindle 32. After releasing the tool clamps 76, the changer arm 74 is pivoted through 90° back into its initial position, allowing the machining of the workpiece 2 to be continued in the manner already described above. With respect to the further mode of operation, reference is made to the preceding embodiments.

Figure 9:
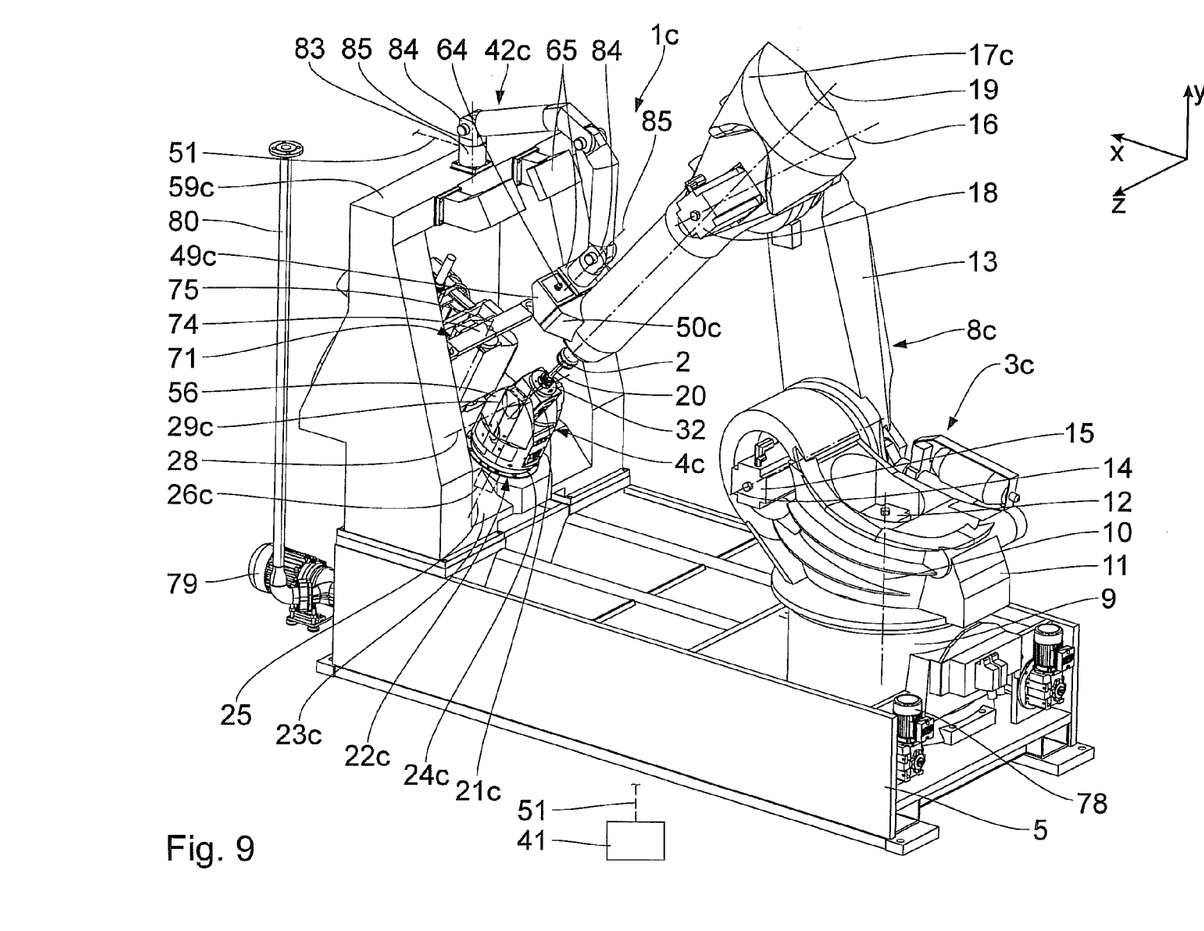
FIG. 9 is a perspective view of a machining installation according to a fourth embodiment in a machining state.
Figure 10:
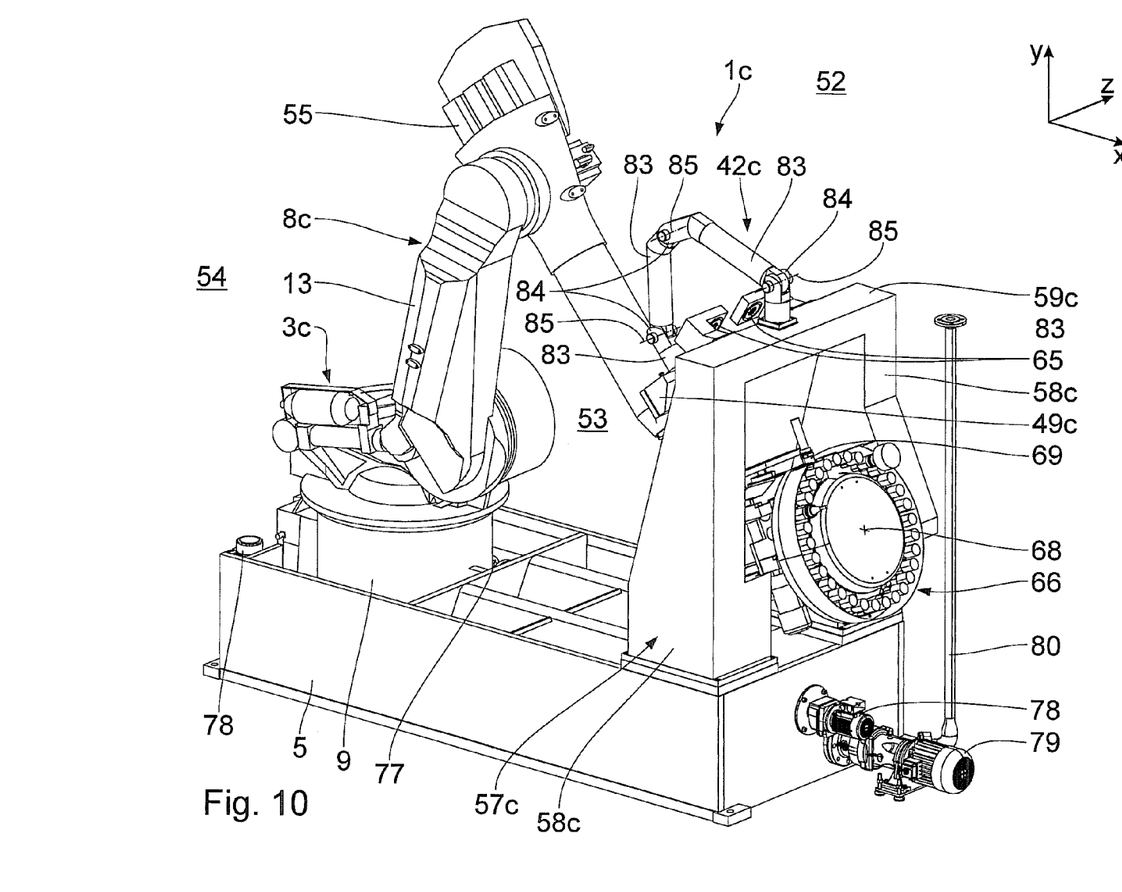
FIG. 10 is another perspective view of the machining installation of FIG. 9.

The following is a description of a fourth embodiment of the invention with reference to FIGS. 9 and 10. Identically designed parts have the same reference numerals as in the preceding embodiments to the description of which reference is made. Differently designed parts with the same function have the same reference numerals with a subsequent c. The positioning devices 3c, 4c correspond to the third embodiment and therefore have four workpiece holder pivot axes 10, 14, 16 and 55 as well as two tool holder pivot axes 25 and 28. The design of the tool magazine 66 and of the tool changer 71 corresponds to the third embodiment.

In contrast to the third embodiment, the support frame 57c is in the shape of a U and formed in one piece with the second base frame 23b. The ends of the horizontal girder 59c are mounted to the vertical girders 58c. The position measuring unit 42c is a mechanical measuring kinematics in the shape of a joint arm. The joint arm comprises several rigid arm portions 83 which are interconnected in pairs via revolute joints 84 at their ends for rotation about in each case one horizontal rotary measuring axis 85. A first arm portion 83 at the end of the joint arm is mounted to the horizontal girder 59c for rotation about a vertical rotary measuring axis 85. A second arm portion 83 at another end of the joint arm is mounted to the first connection member 49c for rotation about another rotary measuring axis 85. When the position measuring unit 42c is connected, this rotary measuring axis 85 is substantially parallel to the fourth workpiece holder pivot axis 19. The rotary measuring axes 85 are provided with rotary encoders (not shown) allowing the absolute position of the workpiece holder 7 to be measured in the x-, y-, and z-directions.

The joint arm has a simple design and higher mobility and flexibility than the λ-kinematics. With respect to the further mode of operation, reference is made to the preceding embodiments.

Figure 11:
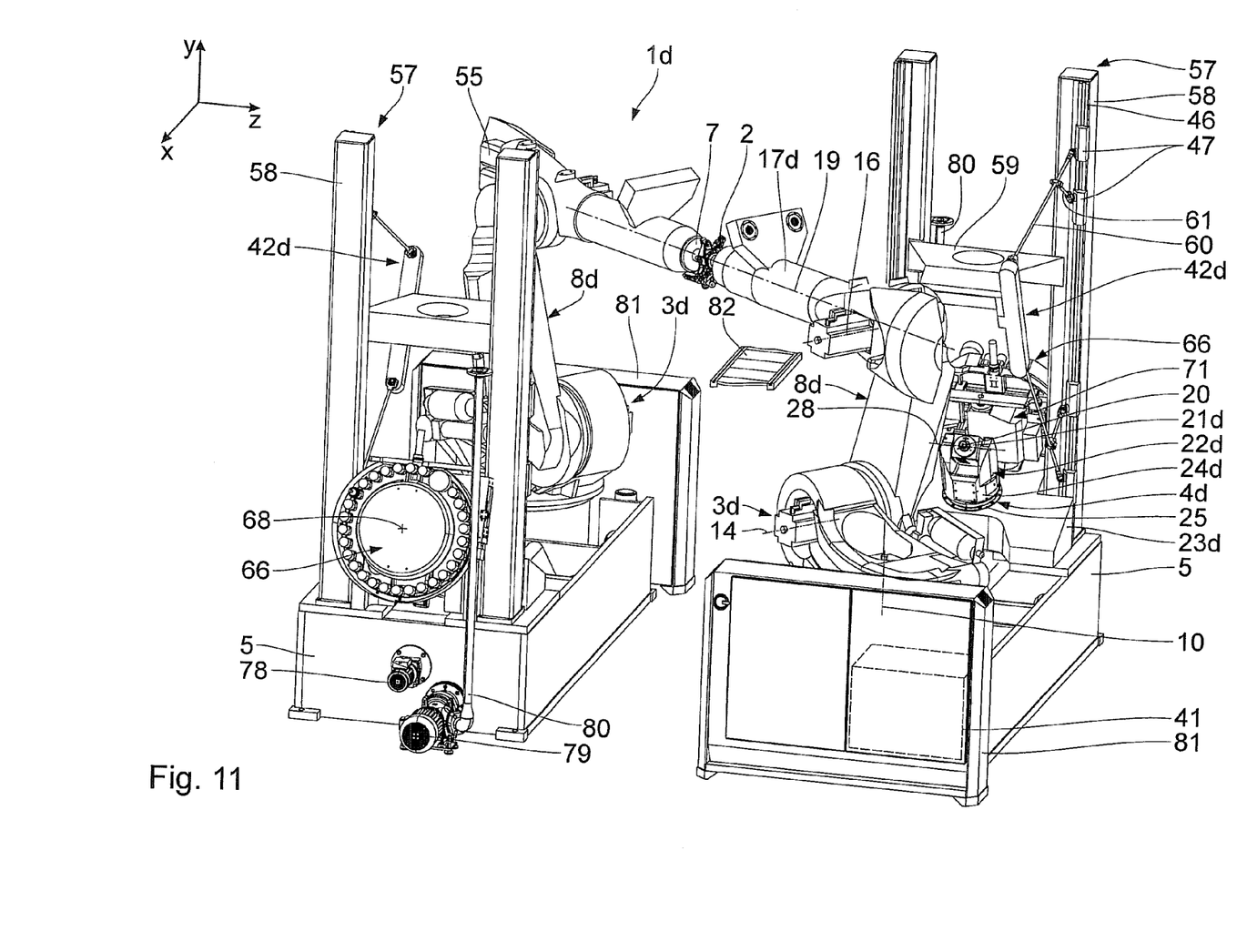
FIG. 11 is a perspective view of a machining installation according to a fifth embodiment in a transfer state.

The following is a description of a fifth embodiment of the invention with reference to FIG. 11. Identically designed parts have the same reference numerals as in the preceding embodiments to the description of which reference is made. Differently constructed parts with the same function have the same reference numerals with a subsequent d. The machining installation 1d comprises two workpiece positioning devices 3d and two associated tool positioning devices 4d. One of the workpiece positioning devices 3d and one associated tool positioning device 4d are arranged on a sub-frame 5 where they interact with an associated position measuring device 42d and an associated tool magazine 66 as well as a tool changer 71. The machining installation 1d therefore forms two adjacent machining installations corresponding to the third embodiment. The workpiece positioning devices 3d are arranged relative to each other in such a way that they are able to transfer back and forth workpieces 2 as shown in FIG. 11. This provides for rough and fine machining of the workpieces 2 and/or for machining the workpieces 2 on opposite sides. After the first machining of the workpiece 2, the workpiece 2 is transferred from the first workpiece positioning device 3d to the second workpiece positioning device 3d which continues with the machining of the workpiece 2. The transport belt 82d for supplying and carrying off the workpieces 2 extends between the sub-frames 5. After the transfer of a workpiece 2, the unloaded workpiece positioning device 3d is immediately able to pick up a new workpiece 2. Correspondingly, the second workpiece positioning device 3d is immediately able to receive a partly machined workpiece 2 from the first workpiece positioning device 3d after depositing the finished workpiece 2. In this manner, a principally random number of machining installations according to the preceding embodiments may be arranged next to each other in alternating orientations so as to form a plurality of machining stations. With respect to the further mode of operation, reference is made to the preceding embodiments.

The workpiece positioning devices 3, 3a to 3d may be randomly combined with the tool positioning devices 4, 4a to 4d. Moreover, the work spindle units 21, 21a to 21d are randomly interchangeable. In particular the work spindle units 21 and 21a comprising a displaceable spindle axis 34 are randomly interchangeable with the work spindle units 21b to 21d comprising a non-displaceable spindle axis 34. Moreover, the workpiece positioning devices 3, 3a to 3d may be randomly combined with the position measuring units 42, 42b to 42d. Each of the machining installations 1, 1a to 1d may comprise a tool magazine 66 with an associated tool changer 71 and/or at least one transport device 82 for transporting workpieces 2 to and away from the machining installation 1. The tool magazine 66 and the tool changer 71 may principally be of random design. If the tool magazine 66 is appropriately designed and arranged, the tools 20 may also be directly supplied to the work spindle units 21, 21a to 21d so that a tool changer 71 is not required. The at least one transport device 82 may be randomly designed and arranged for transporting workpieces 2.

The invention claimed is:
1. A machining installation for workpieces, the machining installation comprising
   a workpiece positioning device for positioning workpieces to be machined, the workpiece positioning device comprising
     a first base frame;
     a workpiece holder; and a workpiece holder pivot unit
  which is arranged between the first base frame and the workpiece holder; and
  which is designed such that the workpiece holder is pivotable about at least three and no more than four workpiece holder pivot axes;
a tool positioning device for positioning tools provided for machining the workpieces, the tool positioning device comprising
a second base frame;
a tool holder, the tool holder being a work spindle unit comprising a work spindle which is drivable for rotation about a spindle axis; and
a tool holder pivot unit
  which is arranged between the second base frame and the tool holder; and
  which is designed such that the tool holder is pivotable about no more than two tool holder pivot axes; and
a position measuring unit provided for measuring an absolute position of the workpiece holder.

2. A machining installation according to claim 1, wherein the workpiece holder pivot unit is designed such that
  a first workpiece holder pivot member is arranged on the first base frame for pivoting movement about a first vertical workpiece holder pivot axis;
  a second workpiece holder pivot member is mounted to the first workpiece holder pivot member for pivoting movement about a second horizontal workpiece holder pivot axis;
  a third workpiece holder pivot member is mounted to the second workpiece holder pivot member for pivoting movement about a third horizontal workpiece holder pivot axis; and
  the workpiece holder is mounted to the third workpiece holder pivot member.

3. A machining installation according to claim 1, wherein the workpiece holder pivot unit comprises exactly three workpiece holder pivot axes.

4. A machining installation according to claim 3, wherein the workpiece holder is rigidly mounted to the third workpiece holder pivot member.

5. A machining installation according to claim 1, wherein the workpiece holder pivot unit comprises exactly four workpiece holder pivot axes.

6. A machining installation according to claim 5, wherein the workpiece holder is mounted to the third workpiece holder pivot member for pivoting movement about a fourth workpiece holder pivot axis, with the fourth workpiece holder pivot axis being a central longitudinal axis of the third workpiece holder pivot member.

7. A machining installation according to claim 1, wherein the tool holder pivot unit is designed such that
  a first tool holder pivot member is arranged on the second base frame for pivoting movement about a first horizontal tool holder pivot axis;
  a second tool holder pivot member is mounted to the first tool holder pivot member for pivoting movement about a second vertical tool holder pivot axis; and
  the tool holder is mounted to the second tool holder pivot member.

8. A machining installation according to claim 1, wherein the tool holder pivot unit is designed such that
  a tool holder pivot member is arranged on the second base frame for pivoting movement about a tool holder pivot axis extending vertically relative to the second base frame; and
  the tool holder is mounted to the tool holder pivot member for pivoting movement about a second horizontal tool holder pivot axis.

9. A machining installation according to claim 1, wherein the tool holder pivot unit comprises exactly two tool holder pivot axes.

10. A machining installation according to claim 1, wherein a position measuring unit is designed as mechanical measuring kinematics.

11. A machining installation according to claim 10, wherein the mechanical measuring kinematics is detachably mounted to the workpiece positioning device.

12. A machining installation according to claim 10, wherein the mechanical measuring kinematics is arranged on a support frame which is mounted on a common sub-frame together with the workpiece holder positioning device and the tool holder positioning device.

13. A machining installation according to claim 1, wherein a tool magazine and a tool changer interacting with said tool magazine and the tool holder are provided which are arranged on a common sub-frame together with the workpiece holder positioning device and the tool holder positioning device.

14. A machining installation according to claim 1, wherein the spindle axis of the work spindle is displaceable relative to the spindle housing.

15. A machining installation according to claim 1, wherein computing unit is provided
  which is coupled with the position measuring unit and the work spindle unit; and
  which is designed such that positioning errors of the workpiece holder are compensable.

16. A machining installation according to claim 1, wherein a computing unit comprising a computed model of the workpiece positioning device is provided, with positioning errors of the workpiece holder being detectable and compensable by means of the computed model.

* * * * *